Oct. 25, 1927.
N. SKILLMAN
1,646,884
COMBINED SPRING SHACKLE AND SHOCK ABSORBER
Filed April 26, 1926
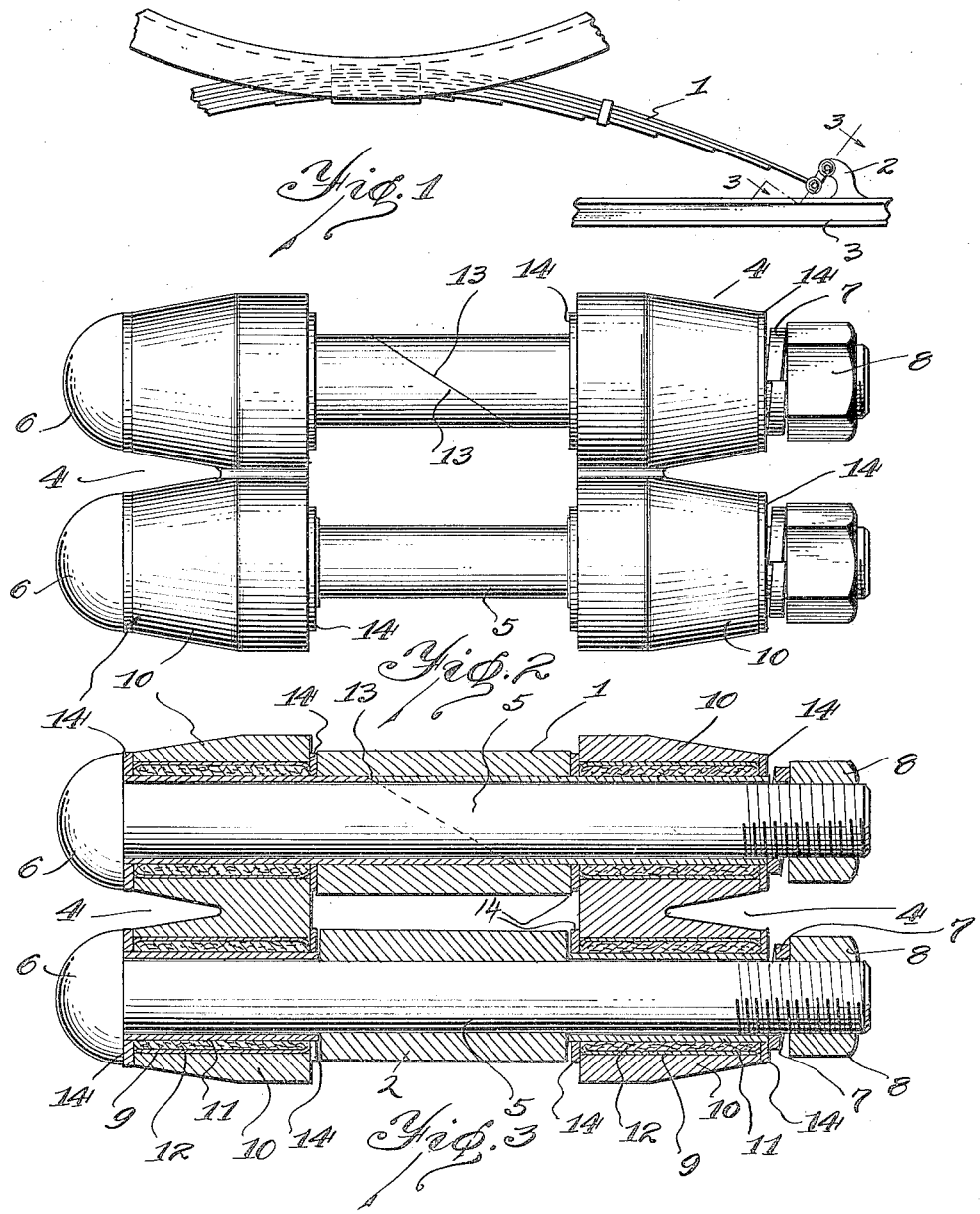
INVENTOR.
Newton Skillman
BY
ATTORNEYS Patented Oct. 25, 1927.

1,646,884

UNITED STATES PATENT OFFICE.

NEWTON SKILLMAN, OF HIGHLAND PARK, MICHIGAN.

COMBINED SPRING SHACKLE AND SHOCK ABSORBER.

Application filed April 26, 1926. Serial No. 104,733.

The invention relates to spring shackles and has for one of its objects the provision of a spring shackle which additionally functions as a shock absorber. Another object is to provide a spring shackle which is so constructed that there is no metal to metal contact between the relatively movable parts. A further object is to provide a spring shackle in which the relatively movable parts carrying the load are self-lubricated.

With these as well as other objects in view, the invention resides in the novel features of construction and combinations and arrangements of parts as more fully hereinafter set forth.

In the drawings:—

Figure 1 is a front elevation of a portion of a motor vehicle having applied thereto a spring shackle embodying my invention;

Figure 2 is a plan view of the spring shackle;

Figure 3 is a cross section on the line 3—3 of Figure 1.

As shown in the present instance, my spring shackle is an accessory which may be readily substituted for the spring shackle already upon a vehicle. 1 is the bowed vehicle spring which is secured at its middle to the vehicle frame and at its ends to the horns 2 upon the axle 3. This is standard construction of one of the motor vehicle manufacturers and my spring shackles are designed so that they may be readily substituted for the spring shackles which connect the ends of the spring 1 to the horns 2, the split bushings in the ends of the springs being first removed.

My shackle comprises the links 4 at the sides of the spring 1 and horn 2 and the bolts 5 which extend through the ends of the spring and the horn and the links, there being the heads 6 at one end and the lock washers 7 and nuts 8 at the other end. I provide self-lubricated bearings in the links and surrounding the bolts for carrying the load and providing for the rotation of the ends of the spring and the horn relative to the links. In detail, each bearing has the outer section 9 in the nature of a cylindrical sleeve, which is housed within an enlargement 10 at either end of a link 4. Each bearing also has the concentric inner section 11 in the nature of a cylindrical sleeve and the bushing 12 between these sections and formed of a highly compressed fabric impregnated with lubricant. The outer section is non-rotatably secured to a link as by pressing the former into the latter while the inner section is non-rotatably secured to either the end of the spring or the horn so that in the operation of the shackle these sections are relatively rotatable, the bushing 12 being preferably movable with the outer section 9 about the inner section 11. However, relative rotation is resisted by reason of the bushing being highly compressed upon the inner section.

For the purpose of non-rotatably securing the inner sections 11 of the pair of bearings between the ends of the spring 1 and the links 4, these sections are extended inwardly into the ends of the spring and are provided with beveled overlapping ends 13. The outer ends of these inner sections extend slightly beyond the outer sides of the links 4 so that upon tightening up the nut 8 of the bolt 5 which extends through these inner sections the latter are moved toward each other and their ends are deflected to firmly and non-rotatably engage the eye of the spring. For the purpose of non-rotatably securing the inner sections of the bearings between the horns 2 and links 4, the inner ends of the inner sections of these bearings are extended inwardly beyond the inner sides of the links to engage the sides of the horns. The outer ends of these inner sections are also extended slightly beyond the outer sides of the links so that upon tightening the nuts 8 of the bolt 5 passing through these inner sections the latter are forced toward each other to firmly and non-rotatably engage the horns.

To prevent metal to metal contact at any point between the ends of the spring 1 and the horns with the shackles, I have provided the spacers 14 preferably formed of fibre or the like and surrounding the inner and outer ends of the inner sections 11 of the bearings adjacent to the inner and outer sides of the links, these washers having a thickness slightly less than the lengths of the extensions of the inner sections so that the former will not interfere with the securing of the inner sections from rotation.

From the above description it will be readily seen that I have provided a spring shackle which is so designed that it may readily replace or be substituted for a spring shackle now forming part of the standard construction. It will also be seen that I have provided a spring shackle which functions as a shock absorber, owing to the resistance to relative rotation caused by the compressed bushing; which provides self-lubricated bearings for carrying the load and taking care of rotation of the ends of the spring and the horns relative to the links and which is designed to avoid metal to metal contact between the relatively movable parts.

What I claim as my invention is:

1. The combination with a vehicle spring and member to which said spring is movably connected, of a shackle including a link and means connecting said link to said members, said means including a bearing carried by said link having a section non-rotatably secured to said link and a concentric section non-rotatably secured to one of said members, said sections being relatively rotatable.

2. The combination with a vehicle spring and member to which said spring is movably connected, of a shackle including a link and means connecting said link to said members, said means including a bearing carried by said link having a section non-rotatably secured to said link, a concentric section non-rotatably secured to one of said members, said sections being relatively rotatable, and a lubricant impregnated bushing between said sections.

3. The combination with a vehicle spring and member to which said spring is movably connected, of a shackle including a link and means for connecting said link to said members, including a pair of bearings carried by said link, each bearing having relatively rotatable sections non-rotatably secured to said link and one of said members and a lubricant impregnated bushing between said sections.

4. The combination with a vehicle spring and member to which said spring is movably connected, of a shackle connecting said members including links at the sides of said members and bolts extending through said members and links and bearings carried by said links and surrounding said bolts, said bearings having outer sections non-rotatably secured in said links, concentric inner sections non-rotatably secured to said members and lubricant impregnated bushings between said sections.

5. The combination with a vehicle spring and member to which said spring is movably connected, of a shackle connecting said members including links at the sides of said members and bolts extending through said members and links and bearings in said links and surrounding said bolts, one of said bearings having an outer section non-rotatably secured in said link, a concentric inner section extending laterally beyond the sides of said link and having an end portion adapted to non-rotatably engage one of said members and a lubricant impregnated bushing between said sections.

6. The combination with a vehicle spring and member to which said spring is movably connected, of a shackle connecting said members including links at the sides of said members and bolts extending through said members and links and bearings in said links and surrounding said bolts, one pair of said bearings having outer sections non-rotatably secured in said links, concentric inner sections provided with beveled overlapping ends and lubricant impregnated bushings between said sections, said inner sections being adapted upon movement toward each other to firmly and non-rotatably engage one of said members.

7. The combination with a vehicle spring and a member to which said spring is movably connected, of means for connecting said members comprising a shackle having links at the sides of said members, bolts extending through said members and links, bearings in said links and surrounding said bolts, each comprising an outer section non-rotatably secured in a link, a concentric inner section non-rotatably secured to one of said members and a lubricant impregnated bushing between said sections, and non-metallic spacers surrounding said bolts for separating said links from said members.

8. The combination with a vehicle spring and member to which said spring is movably connected, of a shackle including a link and means connecting said link to said members, said means including a self-lubricated bearing carried by said link and having a section non-rotatably secured to said link and a cooperating section non-rotatably secured to one of said members, said sections being relatively rotatable.

9. The combination with a vehicle spring and member to which said spring is movably connected, of a shackle connecting said members including links at the sides of said members comprising annular recessed portions integrally connected to each other, bolts extending through said members and through the recessed portions of said links, bearings carried by said links and surrounding said bolts, said bearings having outer sections non-rotatably secured in the recessed portions of said links, concentric inner sections non-rotatably secured to said members and lubricant impregnated bushings between said sections.

In testimony whereof I affix my signature.

NEWTON SKILLMAN.